United States Patent
Lueken

(10) Patent No.: US 10,586,441 B2
(45) Date of Patent: Mar. 10, 2020

(54) ARRANGEMENT FOR TRIGGERING AT LEAST ONE ALARM

(71) Applicants: Mitchell Mkrtchian, Oldenburg (DE); Johannes Lueken, Ramsloh (DE)

(72) Inventor: Johannes Lueken, Ramsloh (DE)

(73) Assignees: Mitchell Mkrtchian, Oldenburg (DE); Johannes Lueken, Ramsloh (DE)

( * ) Notice: Subject to any disclaimer, the term of this patent is extended or adjusted under 35 U.S.C. 154(b) by 0 days.

(21) Appl. No.: 15/984,156

(22) Filed: May 18, 2018

(65) Prior Publication Data
US 2018/0336778 A1 Nov. 22, 2018

(30) Foreign Application Priority Data
May 18, 2017 (DE) .................. 10 2017 110 838

(51) Int. Cl.
G08B 25/10 (2006.01)
H04M 11/04 (2006.01)
H04M 1/725 (2006.01)
G08B 13/14 (2006.01)

(52) U.S. Cl.
CPC ......... G08B 25/10 (2013.01); G08B 13/1427 (2013.01); H04M 1/72527 (2013.01); H04M 11/04 (2013.01); H04M 1/72569 (2013.01)

(58) Field of Classification Search
CPC ............. G08B 25/10; G08B 13/1427; H04M 1/72527; H04M 11/04; H04M 1/72569
USPC .................................. 340/539.11–539.19
See application file for complete search history.

(56) References Cited

U.S. PATENT DOCUMENTS

| | | | |
|---|---|---|---|
| 9,390,614 B2 * | 7/2016 | Cruver | H04W 4/90 |
| 2012/0238238 A1 * | 9/2012 | Galuszka | G08B 25/016 |
| | | | 455/404.2 |
| 2012/0282886 A1 | 11/2012 | Amis | |
| 2017/0086050 A1 | 3/2017 | Kerning et al. | |
| 2019/0297485 A1 * | 9/2019 | Baldree | H04M 1/7253 |

FOREIGN PATENT DOCUMENTS

DE 10 2009 023 003 A1 12/2010

* cited by examiner

*Primary Examiner* — Emily C Terrell
(74) *Attorney, Agent, or Firm* — Muncy, Geissler, Olds & Lowe, PC

(57) ABSTRACT

In an arrangement for triggering at least one alarm having at least one mobile data device with an interface for transmitting data and/or electrical currents to at least one other device, and having at least one device linked to the interface, software is stored on the data device. The software has access to physical signals emanating from the interface when the device is disconnected from the interface and which is linked to at least one further component of the data device. This arrangement allows a secure alarm even in hard-pressed situations.

7 Claims, 2 Drawing Sheets

ARRANGEMENT FOR TRIGGERING AT LEAST ONE ALARM

BACKGROUND OF THE INVENTION

Field of the Invention

The invention relates to an arrangement for triggering at least one alarm, comprising at least one mobile data device having an interface for transmitting data and/or electrical currents to at least one other device, and comprising at least one device linked to the interface.

Brief Summary of the Related Art

Mobile data devices of the aforementioned type may be, for example, mobile phones, portable music players or other so-called handheld devices. These are used for telephoning, for surfing the Internet or for data processing, such mobile data devices are also used quite regularly for listening to audio data. On mobile phones also on the road, for example, when cycling, jogging or strolling through the city.

An alarm in a threatening situation, for example, may then be necessary if the carrier of a mobile data device becomes a witness of a traffic accident, observes a natural disaster such as a local flood or even feels threatened by the approach of third parties in his personal environment. An alarm can break the mobile device carrier out of his isolation and provide additional assistance.

While a telephone call can be made with a mobile telephone when a danger is detected, in certain cases, having a conversation is not possible. In a sudden robbery, for example, the offender will not permit telephone conversations.

SUMMARY OF THE INVENTION

The invention has for its object to disclose an arrangement of the type previously mentioned, with which a secure alarm is possible even in hard-pressed situations.

This invention is achieved in that software is stored on the data device, the software having access to physical signals emanating from the interface when the device is disconnected from the interface and which is linked to at least one further component of the data device.

The mobile data device may contain data and thus also programs for data processing. In the arrangement according to the invention, software is stored locally on the data device, the software monitoring the interface of the data device for transmitting data to a device, e.g., of audio data, to at least one loudspeaker. Such a device may also be a charging device for the mobile data device, such as is used in trains for charging the data device. The software checks the physical conditions of this interface.

For example, physical signals will occur if the loudspeaker is disconnected from the interface. These specific physical signals are detected by the software, for which purpose the software accesses information of the operating system of the mobile data device. Since the software is linked to another component of the data device, it can control this component and set this component in a function. For example, a local noise generation can take place, in which the further component is a loudspeaker, which is controlled by the software with maximum sound volume. This can, for example, deter a local offender.

In the arrangement according to the invention, it is thus possible to trigger an alarm state solely by disconnecting, e.g., the loudspeaker from the data device. This disconnection of the loudspeaker from the data device can be done, for example, by pulling a headphone cable from a mobile phone, quickly and unobtrusively. The alarm commencing from this is possible without the making a phone call and without prior unlocking of the data device. Help can be summoned quickly.

According to a first alternative of the arrangement according to the invention, the physical signals emanating from the interface are electrical voltage changes. If, for example, the headphone plug is pulled out of the data device, the power supply of the headphone ends with electrical voltages for playing back audio data. These voltage changes are received by the software and converted into the presence of the alarm state. The further component of the data device is controlled. As an alternative to electrical voltage changes, electrical resistance changes and/or electrical current strength changes may also be detectable at the interface.

The interface for the data can be configured by at least one socket in the data device, a plug can be assigned to the headphones, the plug being able to be inserted into the socket. The interface can also be configured by a wireless connection, such as a Bluetooth connection. Even with the interruption of a Bluetooth connection, there are, for example, voltage or current changes at the operating system level that can be registered by the software arranged on the data device according to the invention.

As already mentioned above, the linked component can be a loudspeaker, in particular a loudspeaker built into the data device. This can be controlled by the software on the data device with the arrangement according to the invention with maximum sound volume to attract attention.

However, according to a development of the arrangement according to the invention, it can also be provided that the linked component is a wireless transmission unit of the data device. The wireless transmission unit may be, for example, a GSM module that can make phone calls or also send messages. However, the wireless transmission unit may also be configured by software, such as, for example, messenger software.

In particular, if information about data connections to third parties is stored in the wireless transmission unit, this information can be used in the wireless transmission unit for the purpose of sending messages when an alarm occurs. Messages may already be prepared which send to third parties, such as, for example, to friends of the user of the data device or also to regulatory bodies such as the police. However, it is also possible to switch on the mobile data device with a microphone and/or camera in order to transmit detected data in this case. When transmitting the data, further information of the data device such as, for example, the geographical coordinates of the arrangement of the data device can be transmitted, so that help from third parties can be brought to the location in a targeted manner.

According to a next development of the invention, it is provided that information about a data connection to a central server is stored in the wireless transmission unit. With the arrangement according to the invention, not only an alarm can be made on-site according to this development, it is also not intended to inform only a third party with the mobile data device. Rather, this development proposes to establish a connection to a central server. Information for this data connection is stored in the wireless transmission unit. A processing of the received data is then possible with a server.

Thus, a further development of the invention provides that a mechanism for duplicating the received data and for sending the duplicated data to other data devices of third-party persons or institutions is arranged in the server. The received data may include, for example, the time, GPS space coordinates. These data are reproduced and sent to third parties. These third-party persons can be stored beforehand, including names and addresses of acquaintances of the person using the mobile data device or also authorities and rescue workers.

A further development of the invention also provides that a countdown mechanism independent of mobile end devices is arranged within the server and sends data already collected by the server to predefined data devices after a lapse of time and absence of a deactivation signal. The countdown mechanism can prevent inadvertent false positives from instantly setting a data chain into motion. However, if there is case of alarm, data for this case of alarm will be sent by itself from the server to third parties.

BRIEF DESCRIPTION OF THE DRAWINGS

Embodiments of the arrangement according to the invention are shown in the drawing. They show.

DETAILED DESCRIPTION OF THE PREFERRED EMBODIMENTS

Figure 1:
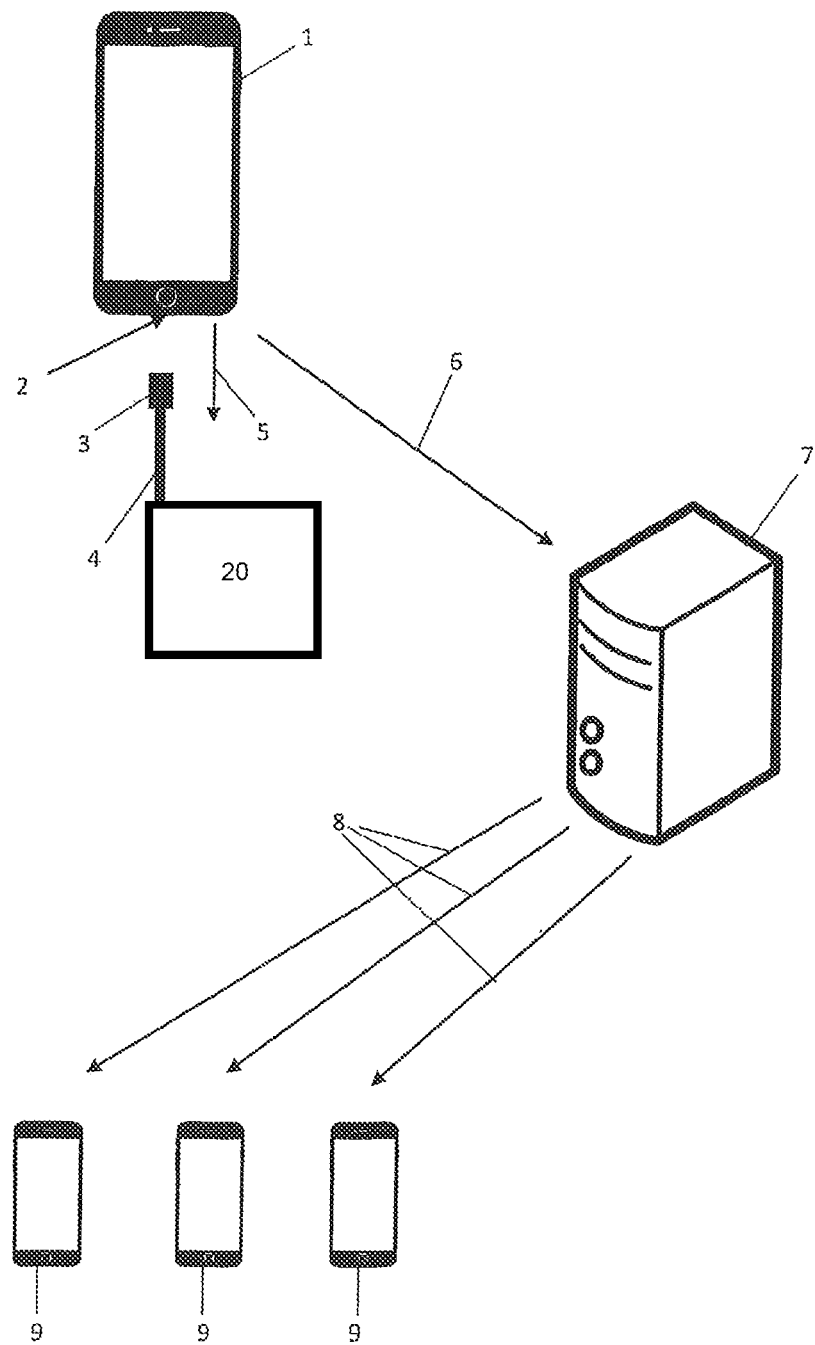
FIG. 1 is a schematic representation of a case of alai iii using an arrangement according to the invention and FIG. 2 is another schematic representation of a case of alarm using a modified arrangement according to the invention.

The arrangement according to the invention comprises a mobile data device 1, which is configured in the embodiment as a mobile phone. On this mobile data device 1 is an operating system and software that has access to an interface 2 of the mobile data device 1. This software can be present in a mobile phone as a mobile data device 1, for example, as a so-called app.

The plug 3 can be connected to the interface 2 at the free end of a cable 4 for an external device 20, such as a loudspeaker 10. The interface 2 may be configured as a socket, but alternatively, a wireless connection between the interface 2 of the mobile data device 1 and a headphone may also be provided.

In a case of alarm, the cable 4 with the plug 3 is removed from the mobile data device 1, as indicated by arrow 5. In this case, information is sent along arrow 6 to a central server 7 by a transmission unit of the mobile data device 1.

This server 7 can duplicate the received message and send it along the arrows 8 to other data devices 9 of third-party persons or institutions. These third-party persons can then organize help or provide help.

Figure 2:
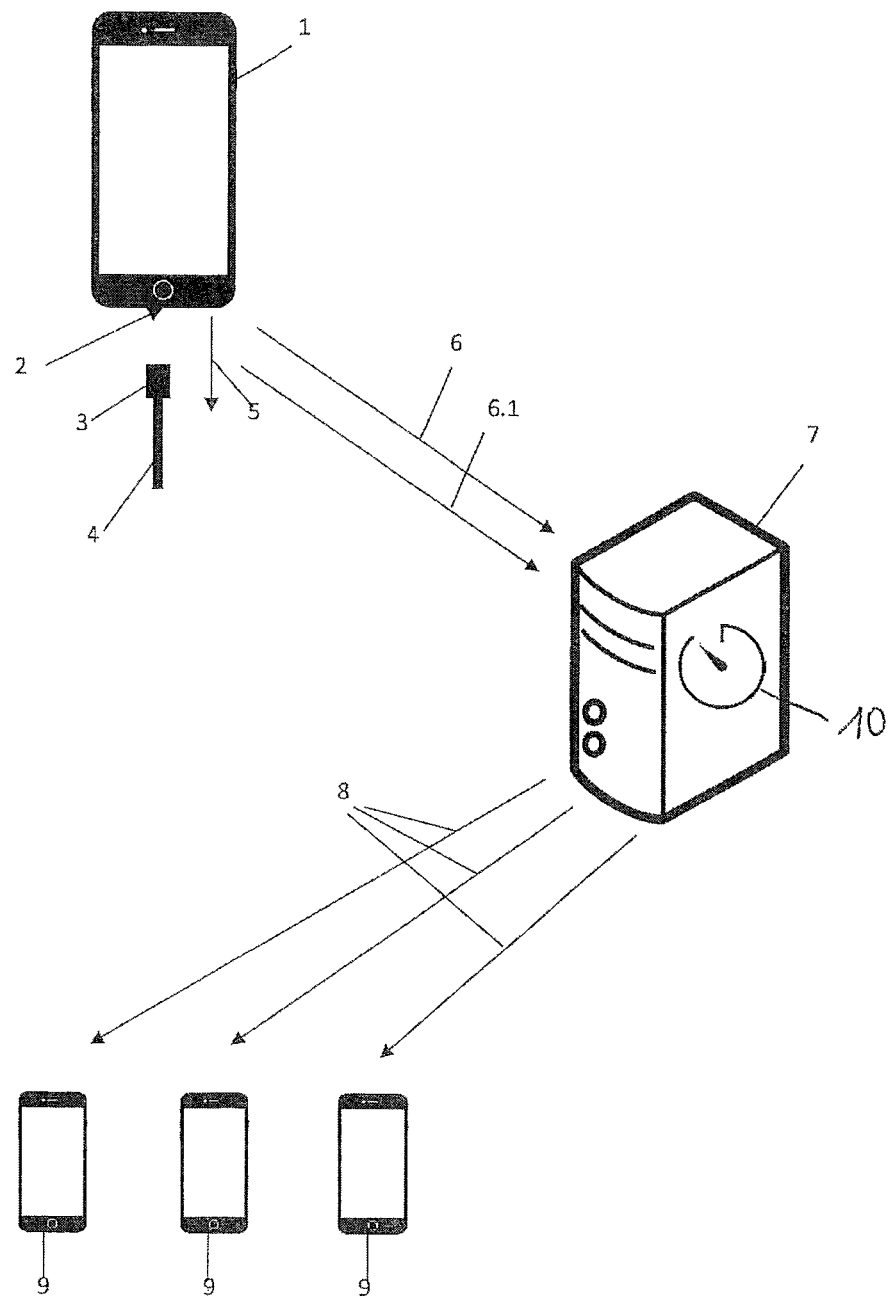

A server 7 is also used in the arrangement according to FIG. 2. This server 7 is additionally equipped with a countdown mechanism 10. If data arrives in a case of alarm, the countdown mechanism 10 is set into motion. It waits for a defined period of time regarding whether the mobile data device 1 is still receiving a deactivation signal along arrow 6.1. If this is not the case, data collected in the server 7 until then will be sent again from the server 7 along the arrows 8 to other data devices 9. This transfer of data along the arrows 8 can be done, for example, by calls in the car, SMS, email, push messages or the like.

The invention claimed is:

1. An arrangement for triggering at least one alarm, comprising at least one mobile data device having an interface for transmitting data and/or electrical currents to at least one device, and comprising at least one link device linked to the interface, wherein
    software is stored on the at least one mobile data device, the at least one mobile data device being configured by the software to detect signals emanating from the at least one interface when the at least one device connected to the interface is disconnected from the interface and which connects to at least one component of the at least one mobile data device,
    wherein the link device is a loudspeaker, in particular a loudspeaker built into the at least one mobile data device.

2. The arrangement according to claim 1, wherein the transmitted data is audio data.

3. The arrangement according to claim 1, wherein the detected signals emanating from the interface correspond to occurring electrical voltage changes.

4. The arrangement according to claim 1, wherein the detected signals emanating from the interface correspond to occurring electrical resistance changes.

5. The arrangement according to claim 1, wherein the detected signals emanating from the interface correspond to occurring electrical current strength changes.

6. The arrangement according to claim 1, wherein the interface is configured by at least one socket in the at least one mobile data device for connecting at least one plug.

7. The arrangement according to claim 1, wherein the interface is configured by a wireless connection.

* * * * *